Feb. 10, 1970 T. P. ZINGARELLI 2ND 3,495,171
CHECKING LINEAR OR NONLINEAR POTENTIOMETERS WITH
LINEAR REFERENCE POTENTIOMETER AND
SIGNAL STORAGE UNIT
Filed Oct. 9, 1967
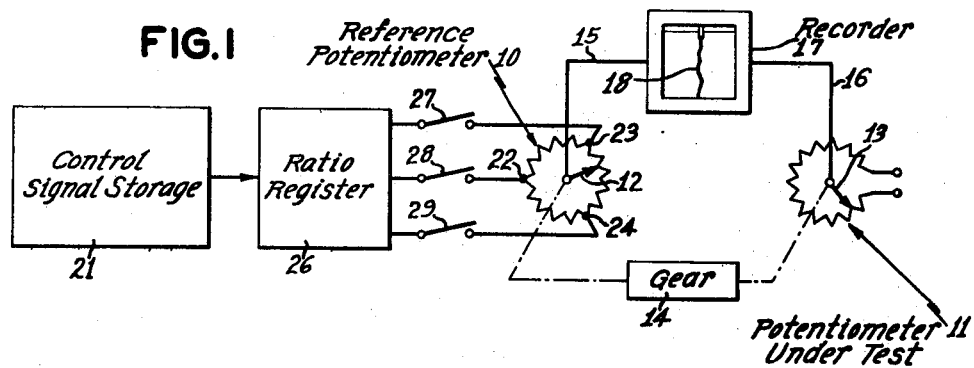
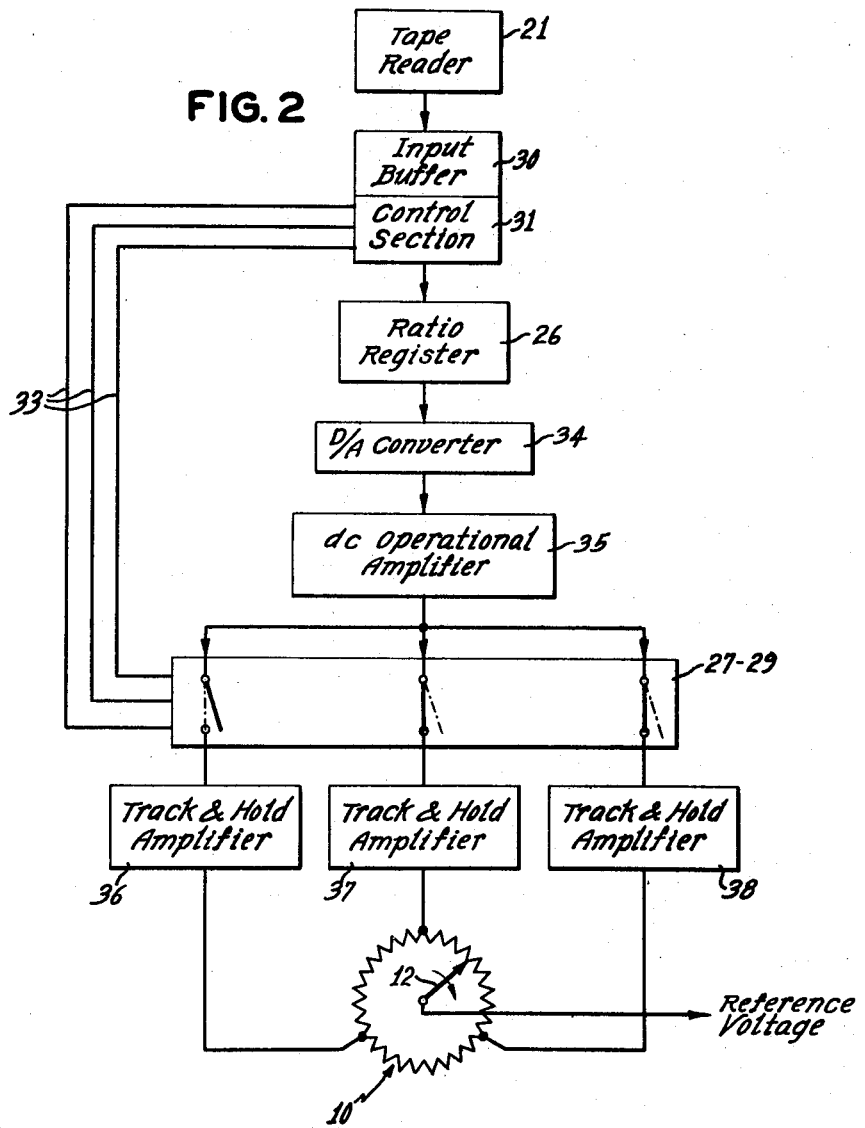

United States Patent Office 3,495,171
Patented Feb. 10, 1970

3,495,171
CHECKING LINEAR OR NONLINEAR POTENTIOMETERS WITH LINEAR REFERENCE POTENTIOMETER AND SIGNAL STORAGE UNIT
Thomas P. Zingarelli 2nd, New York, N.Y., assignor to Litton Precision Products, Inc., Mount Vernon, N.Y., a corporation of Maryland
Filed Oct. 9, 1967, Ser. No. 673,659
Int. Cl. G01r 27/02
U.S. Cl. 324—63          6 Claims

ABSTRACT OF THE DISCLOSURE

Apparatus for checking either linear or nonlinear potentiometers employing a linear reference potentiometer. Potentials are impressed upon taps on the reference potentiometer under control of a signal-storage unit, such as a perforated tape and tape reader, to provide a continuous conformity check of the potentiometer function at an infinite number of points.

Background of the invention

This invention relates to apparatus for checking a potentiometer for conformity with a desired function, and more particularly to apparatus of this character which does not require the use of a master potentiometer having the desired functional characteristic during the test procedure.

A linear continuous potentiometer checker has been used for checking linear-function potentiometers. This arrangement required a master linear potentiometer which is employed to compare the output voltage of the potentiometer under test with that of the master potentiometer while the sliders or contact wipers are rotated in phase. The resulting error may be graphically recorded. The continuous type checker has the advantage that it indicates not only that every point in the potentiometer under test is within desired limits, but also provides troubleshooting information, e.g., whether or not wiper wear exists (indicated by a "grassy" chart recording) and also if small shorts occur in the resistor element. However, this continuous-type apparatus is limited in accuracy, being dependent upon the accuracy of the master potentiometer, and when functions other than linear functions are to be tested, a nonlinear master potentiometer must be made for each function to be checked. This is so costly and time-consuming as to be impractical in most cases.

The incremental type checker, which may employ an angle divider such as that shown in U.S. Patent No. 3,257,870 granted to G. J. Orozco, has the advantage over the continuous type that it may be used to check any function, either linear or non-linear. However, it is limited in the number of incremental measurements by the available angular divisions of the angle-divider used to position the potentiometer slider, and the greater the number of test points, the slower the test operation. It is also subject to inaccuracy of position and backlash error in the operation of the angle divider. On the other hand, apparatus embodying the invention is of the continuous type but possesses the advantages of the incremental type without the limitations of either prior test apparatus as set forth above.

Summary of the invention

An object of the invention is to improve the accuracy speed and flexibility of conformity checking apparatus by employing a tapped linear reference potentiometer in place of the usual master potentiometer and means for impressing predetermined potentials on the taps of the reference potentiometer corresponding to the desired output voltages of the potentiometer under test, as the sliders of respective potentiometers are advanced from the start positions. The successive tap potentials for the reference potentiometer are derived from a control signal-storage unit which may comprise, by way of example and not of limitation, a perforated tape and a tape reader which is stepped in synchronism with the slider advance. Thus potentiometers with different functions, either linear or non-linear, may be checked merely by substitution of suitable tapes in the tape reader, with the accuracy and speed of the continuous checking procedure.

Another object of the invention is to provide a system for continuously checking the conformity of a potentiometer under test, instead of the usual incremental checking at a series of spaced test points, without requiring the use of a master potentiometer. In prior continuous checking systems, a different master potentiometer was used for each different type of potentiometer under test, which for all practical purposes limited the system to the checking of linear potentiometers.

Still another object of the invention is to provide potentiometer-checking apparatus comprising a simple reference potentiometer, a control signal storage unit and means for switching the output potentials from the storage unit to taps on the reference potentiometer in timed relation to the advance of the contact wiper of the potentiometer under test during the test cycle.

Further objects and advantages of the invention will be apparent from the following detailed description.

Brief description of the drawing

In the drawing, FIG. 1 is a block diagram, partially schematic, of the complete test apparatus, and FIG. 2 is a comprehensive block diagram of a typical control circuit including the reference potentiometer shown in FIG. 1.

Description of a preferred embodiment

Referring to FIG. 1 of the drawing, apparatus embodying the invention as shown inclures a reference potentiometer 10 and the potentiometer 11 under test for conformity with the desired functional characteristic. The wipers or movable contacts 12 and 13, respectively, of the potentiometers 10 and 11 are mechanically connected together through suitable gearing 14 as indicated to drive the wipers in unison during the test cycle.

The potentiometers 10 and 11 may be adjusted during the test cycle by a motor as shown, for example, in the above-mentioned Orozco patent. The wipers or contacts 12 and 13 are connected through conductors 15 and 16 to the usual recorder 17 to record a trace 18 representing the error voltge if any. Other suitable error indicating means may be employed if desired. The use of a recording instrument enables rapid and continuous checking of the potentiometer 11 at an infinite number of points, as distinguished from the operation of an incremental checker.

In accordance with the present invention, the master potentiometer used heretofore is replaced b ya simple linear potentiometer 10 which may be used for testing either linear or non-linear potentiometers. In order to effect this result, a control unit 21 is provided to apply varying potentials to the spaced taps 22, 23 and 24 of the reference potentiometer 10, which as shown consists of a continuous unbroken resistance element forming a single-turn potentiometer. While three equally-spaced taps are shown in the drawing, obviously two taps or more than three taps may be employed. Thus by applying the proper potentials to the taps on the reference potentiometer 10, the function of any linear or non-linear potentiometer may be checked. As shown in FIG. 1, the control unit 21 consists of means for storing and sensing a plurality of signals which are transferred in sequence to a ratio register 26 whereby predetermined voltages may be connected at the proper time through switches 27, 28 and 29 to taps 22, 23 and 24. While any suitable signal-storage and sensing apparatus may be employed, by way of example, a perforated tape and tape reader is shown as adapted for this purpose.

Thus as shown in FIG. 2, the control unit 21 comprises a tape reader such as a standard 8-channel tape reader Model 2500, manufactured by the Digitronics Corporation of Albertson, N.Y. The perforated tape supplied to this tape reader may consist of consecutive blocks each including, for example, 5 data characters and an end-of-word character. There are as many blocks in the tape as there are taps to be programmed. The tape reader is connected to an input buffer 30 which converts serial data from the tape into parallel data which is shifted into a ratio register 26 by a control section 31, said section 31 being interposed to control the stepping of the tape and the transfer of the control signals at the proper times to the ratio register 26. The control section 31 is connected through conductors 33 to the switching mechanism 27–29 which connects the signal channels in proper sequence to the taps on the reference potentiometer 10. The ratio register 26 programs a digital/analog converter 34 having its output connected to a Philbrick operational amplifier 35 such as the Model No. SP65A manufactured by George A. Philbrick Researches, Inc. of Boston, Mass. The output of the operational amplifier 35 is connected through switching means 27–29 to three track and hold amplifiers 36, 37 and 38 such as a Philbrick Model No. SPT & H amplifier, one connected in each control signal channel. The output voltages of the amplifiers 36, 37 and 38 apply the desired control potentials to the taps on reference potentiometer 10, said output being maintained by the amplifier until the switching means is operated to connect the succeeding control potential under the control of the control section 31. In a typical case the resistance of the resistor element of the reference potentiometer 10 is 10 to 15K, but this may be widely varied depending upon the circumstances. The successive control signals stored on the control tape are converted to analog signals in the converter 34, connected through the switches 27, 28 and 29 and held on the successive taps on the reference potentiometer 10 by amplifiers 36, 37 and 38 to set up the desired functional characteristics of the potentiometer under test on the reference potentiometer 10.

In accordance with the invention control voltages are set up in sequence on taps 22, 23, and 24 of the reference potentiometer 10 as the wiper 12 rotates so that the voltage on the wiper varies as a function of the angle of the drive shaft which turns the wipers 12 and 13, and by employing different control tapes, different potentiometers may be tested without changing or modifying the reference potentiometer or other elements of the test system.

It will be seen that the invention provides rapid and accurate means for continuous checking of potentiometers without the use of a master. The continuous type of check is faster than checking at discrete points, since the potentiometer is rotated continuously. Obviously, the more points checked by the incremental type, the more time required. Potentiometers having different functions may be checked by merely substituting control tapes or other signal-storage elements in the storing and sensing unit. If non-linear masters were used in the usual checking procedure, which might be feasible on a long production run, there would be a delay of possibly several hours to change over a test set-up from one type of potentiometer to another. In addition, control tapes are readily duplicated, so that several test set-ups can be used to check the same type of potentiometer if desired. Alternatively they could be used with different tapes with each checking a different function, thus providing a high degree of flexibility in production.

What is claimed is:

1. Apparatus for checking a potentiometer for conformity with a desired function comprising:
    means for rotating the wiper of the potentiometer under test,
    means for applying a potential across said potentiometer,
    a linear reference potentiometer having a resistance element and a movable wiper contacting said resistance element, said resistance element having a plurality of spaced taps,
    means for driving said movable wiper of the reference potentiometer at a rate synchronized with the rotation of the wiper of the potentiometer under test,
    error-indicating means connected to the wipers of said potentiometers, and
    means for intermittently impressing predetermined potentials on the taps on said reference potentiometer to generate the desired functional characteristic thereon during the test cycle, said last mentioned means including signal-storage means for a plurality of control signals and means for electrically connecting the output of said signal-storage means to said taps.

2. Apparatus for conformity checking a potentiometer according to claim 1, in which said signal-storage means comprises a perforated tape and tape reader.

3. Apparatus for checking a potentiometer for conformity with a desired function comprising:
    means for rotating the wiper of the potentiometer under test,
    means for applying a potential across said potentiometer,
    a linear reference potentiometer having a continuous resistance element and a movable wiper contacting said resistance element, said resistance element having a plurality of spaced taps,
    means for driving said movable wiper of the reference potentiometer at a rate synchronized with the rotation of the wiper of the potentiometer under test,
    means connected to the wipers of said potentiometers for indicating the differential output representing any error in the functional characteristic of the potentiometer under test,
    a control signal-storage unit having preselected output potentials, and
    means for switching the output potentials from the storage unit to the taps on the reference potentiometer in timed relation to the advance of the wiper of the potentiometer under test during the test cycle.

4. Apparatus for conformity checking a potentiometer according to claim 3, in which said signal-storage unit includes means for producing separate successive output potentials, and control means is provided to time the production of said successive output potentials.

5. Apparatus for conformity checking a potentiometer according to claim 3, in which said signal-storage unit comprises a perforated tape and tape reader, and means is provided to step the tape through said tape reader in timed relation to the advance of the wiper of the potentiometer under test.

6. Apparatus for checking a potentiometer for conformity with a desired function comprising:
    means for rotating the wiper of the potentiometer under test, means for applying a potential across said potentiometer, a linear reference potentiometer having a continuous resistance element and a movable wiper contacting said resistance element, said resistance element having a plurality of spaced taps, means for driving said movable wiper of the reference potentiometer at a rate synchronized with the rotation of the wiper of the potentiometer under test, error indicating means connected to the wipers of said potentiometers, signal-storage means including a perforated tape and tape reader for generating control signals, and means for connecting the control signals successively to the taps on said reference potentiometer to produce the desired function of the potentiometer under test.

References Cited

UNITED STATES PATENTS 2,715,208  8/1955  Hayes.
2,803,799  8/1957  Siegel et al.
3,098,969  7/1963  Liss et al.

OTHER REFERENCES

A. B. Benson, R. E. Kath, and D. H. Skrenes: Temperature Compensation for Sample and Hold Circuit, IBM Technical Disclosure Bulletin 9(5), October 1966.

EDWARD E. KUBASIEWICZ, Primary Examiner

J. M. HANLEY, Assistant Examiner